United States Patent [19]

Fujimoto et al.

[11] Patent Number: 5,200,674

[45] Date of Patent: Apr. 6, 1993

[54] ELECTRIC POWER SUPPLY DEVICE FOR MOBILE VEHICULAR APPARATUS WITH AERIAL CABIN HAVING FORCE-FEEDBACK MANIPULATOR

[75] Inventors: Mineyuki Fujimoto; Kouichi Tsurumaki, both of Okegawa, Japan

[73] Assignee: Aichi Sharyo Co., Ltd., Nagoya, Japan

[21] Appl. No.: 610,771

[22] Filed: Nov. 8, 1990

[51] Int. Cl.⁵ ............................................. H02P 7/00
[52] U.S. Cl. ................................... 318/34; 318/105; 307/66
[58] Field of Search ................... 318/38, 98, 100, 139, 318/149, 151, 153, 158, 568.11, 628, 493, 105–107; 307/66

[56] References Cited

U.S. PATENT DOCUMENTS

| | | |
|---|---|---|
| 4,008,423 | 2/1977 | Christianson et al. ........... 318/493 X |
| 4,095,664 | 6/1978 | Bray ................................. 318/149 |
| 4,127,782 | 11/1978 | Omura et al. ................... 307/66 X |
| 4,127,803 | 11/1978 | Etienne ............................ 318/139 |
| 4,146,924 | 3/1979 | Birk et al. ..................... 318/568.11 |
| 4,715,978 | 6/1988 | Drutchas et al. ................ 318/158 |
| 4,751,398 | 6/1988 | Ertz, III ............................. 307/66 |
| 4,807,767 | 2/1989 | Kornely ............................ 318/628 |
| 4,827,150 | 5/1989 | Reynal .............................. 307/66 |
| 5,010,469 | 4/1991 | Bobry ............................ 307/66 X |

FOREIGN PATENT DOCUMENTS

| | | |
|---|---|---|
| 60-147923 | 10/1985 | Japan . |
| 61-81111 | 4/1986 | Japan . |
| 62-178108 | 8/1987 | Japan . |
| 62-268312 | 11/1987 | Japan . |
| 63-144995 | 9/1988 | Japan . |
| 63-173193 | 11/1988 | Japan . |
| 64-38273 | 3/1989 | Japan . |
| 64-38274 | 3/1989 | Japan . |
| 1-134912 | 9/1989 | Japan . |
| 1-231800 | 9/1989 | Japan . |
| 2-28895 | 2/1990 | Japan . |
| 2-63992 | 5/1990 | Japan . |
| 2-91789 | 7/1990 | Japan . |
| 2-103089 | 8/1990 | Japan . |
| 2-104988 | 8/1990 | Japan . |
| 2-114308 | 9/1990 | Japan . |
| 2-129108 | 10/1990 | Japan . |
| 2-262813 | 10/1990 | Japan . |

Primary Examiner—A. Jonathan Wysocki
Attorney, Agent, or Firm—Sandler Greenblum & Bernstein

[57] ABSTRACT

An electric power supply device on a mobile vehicular apparatus includes an AC generator, a rectifier connected to the AC generator, for rectifying an electric current generated by the AC generator, a regulator connected to the rectifier, for maintaining the voltage with respect to the rectified electric current at a constant level, the regulator being connected to a power line for transmitting the electric current at the constant-level voltage to a DC electric actuator on a master control arm, and a battery connected to the power line. The master control arm controls a slave manipulator arm for processing or handling a workpiece. When the DC electric actuator is subjected to a large load and needs a large amount of electric power, the battery discharges and supplies the stored electric energy to the DC electric actuator.

6 Claims, 3 Drawing Sheets

ELECTRIC POWER SUPPLY DEVICE FOR MOBILE VEHICULAR APPARATUS WITH AERIAL CABIN HAVING FORCE-FEEDBACK MANIPULATOR

BACKGROUND OF THE INVENTION

The present invention relates to an electric power supply device for a mobile vehicular apparatus with an aerial cabin which has a force-feedback manipulator of a master/slave type which is actuated by a DC power supply.

There are known mobile vehicular apparatus with aerial cabins or platforms which have force-feedback manipulators of the master/slave type that are actuated by DC power supplies. The force-feedback manipulator has a master control arm including electric actuators associated with respective axes. Heretofore, these electric actuators are powered by a power supply device 50 as shown in FIG. 3 of the accompanying drawings. The power supply device 50 comprises an AC generator 51 connected through an AC/DC inverter 52 to electric actuators or motors 55a through 55d. AC electric energy generated by the AC generator 51 is converted by the AC/DC inverter 52 into DC electric energy which is then supplied to the electric actuators 55a through 55d.

Since, however, the AC generator 51 is connected through the AC/DC inverter 52 to the electric actuators 55a through 55d, the output voltage of the AC generator 51 varies as the rotational speed of the AC generator 51 varies. Therefore, the acceptable range of input voltages applied to the AC/DC inverter 52 has to be wide, and hence it causes a problem that the AC/DC inverter 52 must be large in size. Another problem is that when the AC generator 51 stops its operation, no electric energy is supplied to the electric actuators 55a through 55d. Also, when a large load is applied to a slave manipulator arm of the manipulator, the electric actuators 55a through 55d, which serve as force-feedback units for the master control arm, require a large amount of electric energy. Therefore, it causes a further problem that the electric generating capability of the AC generator 51 must be large enough to generate a required amount of electric energy, with the result that the AC generator 51 has to be large in size.

SUMMARY OF THE INVENTION

It is an object of the present invention to make an electric power supply device, for generating DC electric energy to energize DC electric actuators or motors DC for a manipulator device, small.

Another object of the present invention is to provide an electric power supply device which employs a small-size AC generator that can supply a necessary amount of electric energy to electric actuators at all times.

Still another object of the present invention is to provide an electric power supply device capable of enabling a manipulator to operate to a certain extent even when an AC generator happens to cease its operation.

According to the present invention, there is provided an electric power supply device on a mobile vehicular apparatus, including an AC generator, a rectifier connected to the AC generator, for rectifying an electric current generated by the AC generator, a regulator connected to the rectifier for maintaining the voltage with respect to the rectified electric current at a constant level, the regulator being connected to a power line for transmitting the electric current at the constant-level voltage to a DC electric actuator on a master control arm, and a battery connected to the power line.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

Figure 1:
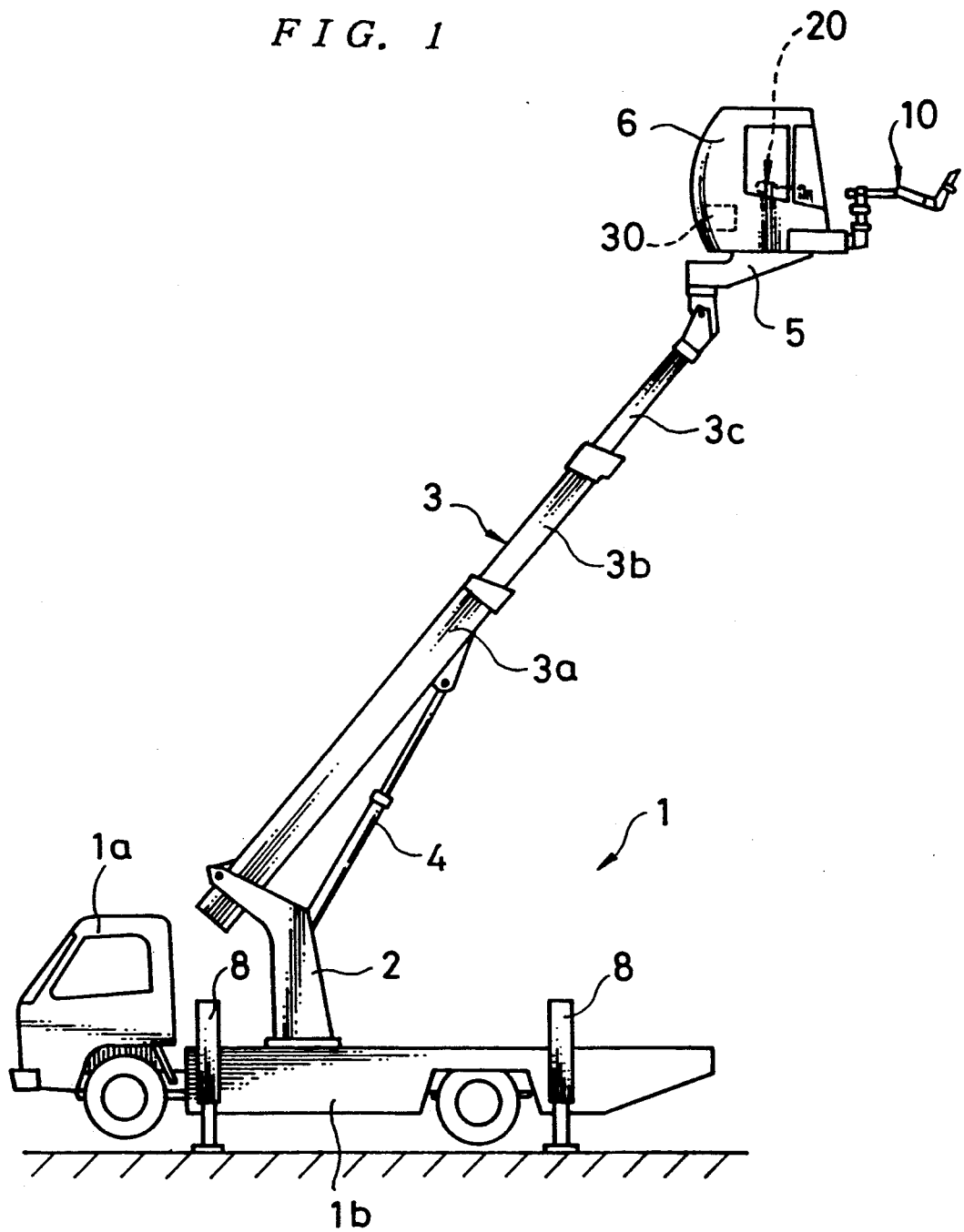
FIG. 1 is a front elevational view of a mobile vehicular apparatus with an aerial cabin which has an electric power supply device according to the present invention.

FIG. 1 shows a mobile vehicular apparatus with an aerial control cabin, incorporating an electric power supply device according to the present invention.

The mobile vehicular apparatus includes a mobile vehicle 1 having a driver's cabin 1a and a vehicle body 1b. The vehicle body 1b supports a turntable 2 which can be turned by a turntable motor. On the turntable 2, there is mounted a telescopic boom 3 which is upwardly extensible and downwardly collapsible, i.e., vertically swingable, by a cylinder 4. The telescopic boom 3 comprises three boom members, i.e., a proximal boom member 3a, an intermediate boom member 3b, and a distal boom member 3c. The distal boom member 3c and the intermediate boom member 3b are slidably movable into and out of the proximal boom member 3a by a hydraulic cylinder disposed in the telescopic boom 3. An aerial control cabin 6 is mounted on a support 5 which is in turn mounted on the tip end of the distal boom member 3c. The aerial control cabin 6 carries an operator (not shown), and can turn horizontally and swing vertically with respect to the boom 3. The aerial control cabin 6 is maintained horizontally at all times and can turn while it is being held in a horizontal condition.

The vehicle body 1b has four outriggers 8 at four corners, i.e., front left, front right, rear left, and rear right corners, the outriggers 8 projecting laterally. The outriggers 8 can be extended downwardly into contact with ground. When in operation, the outriggers 8 are forcibly extended downwardly to support the vehicle body 1b.

A slave manipulator arm 10 is supported on and positioned in front of the control cabin 6. The control cabin 6 houses a master control arm 20 electrically coupled to the slave manipulator arm 10. The master control arm 20 and the slave manipulator arm 10 jointly constitute a master/slave manipulator device. The control cabin 6 also houses an electric power supply device 30 for supplying electric energy to the master/slave manipulator device.

Figure 2:
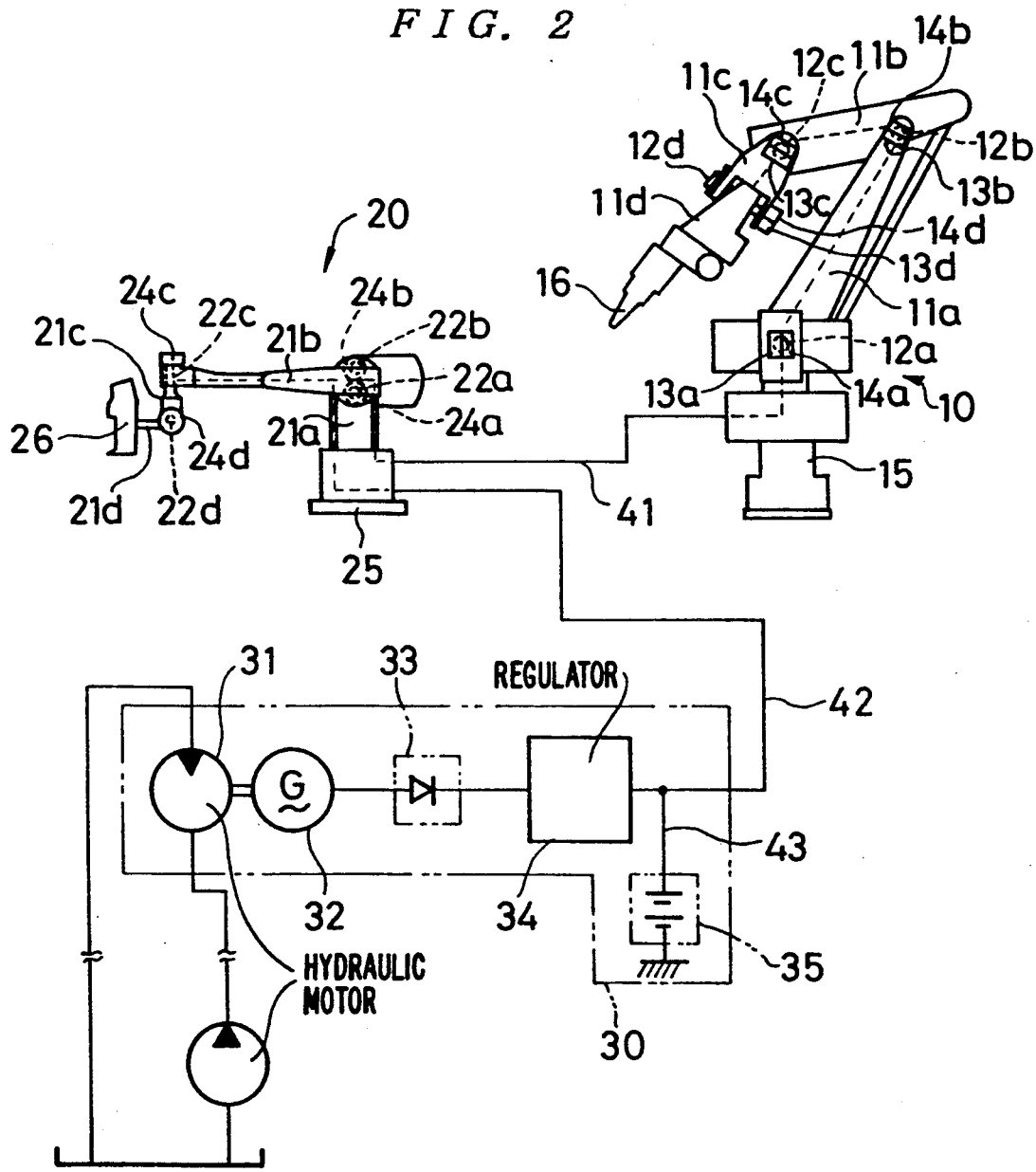
FIG. 2 is a schematic diagram of a circuit arrangement of the electric power supply device and a manipulator device of the mobile vehicular apparatus shown in FIG. 1.
Figure 3:
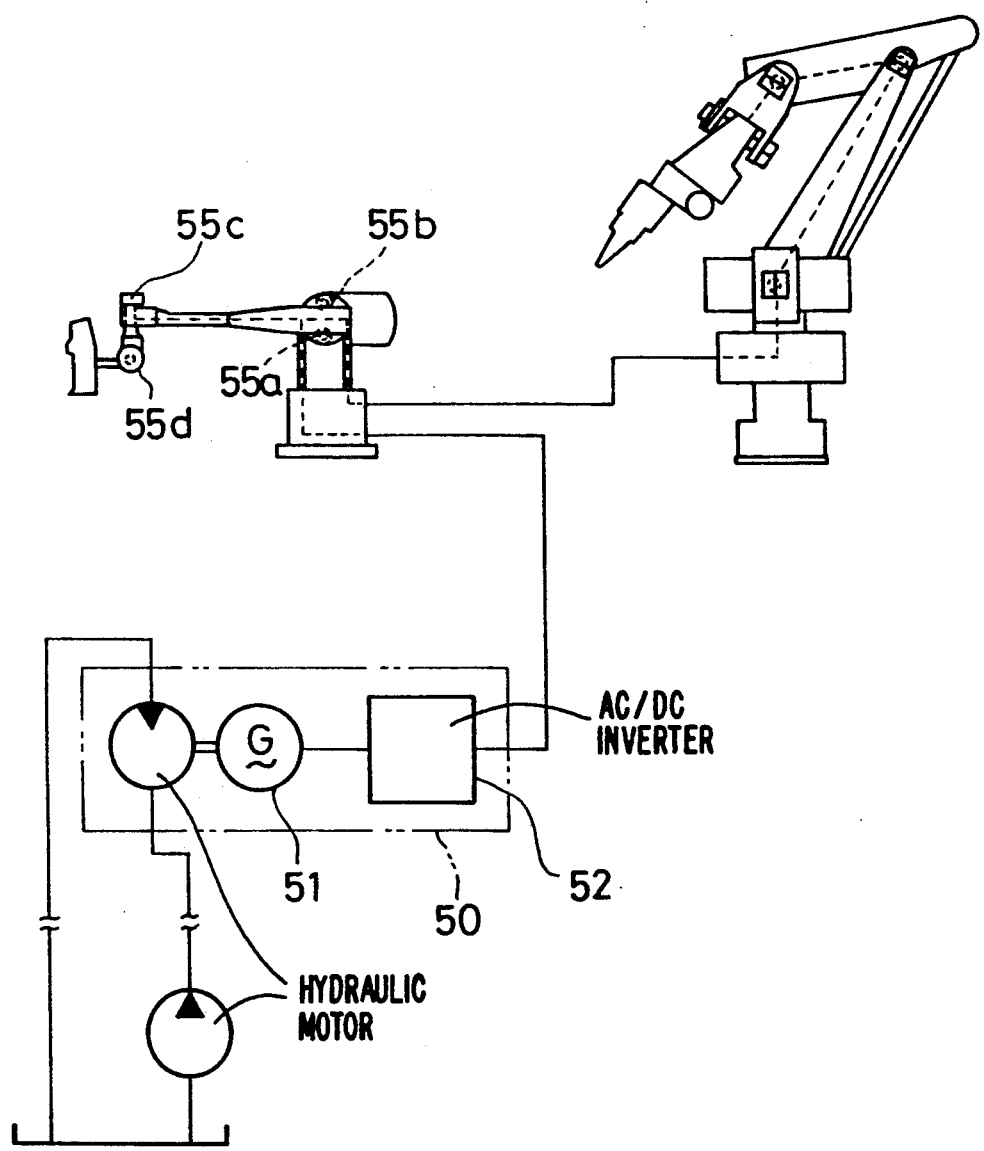
FIG. 3 is a schematic diagram of a circuit arrangement of a conventional electric power supply device and a manipulator device which is powered by the electric power supply device.

The arms 10, 20 and the electric power supply device 30 are shown in detail in FIG. 2.

The slave manipulator arm 10 is disposed on a base 15, and comprises first, second, third, and fourth slave arm members 11a, 11b, 11c, 11d which are operatively coupled by first, second, third, and fourth axes 12a, 12b, 12c, 12d, and a workpiece gripper 16 mounted on the tip of the fourth slave arm member 11d. The first slave arm member 11a is angularly movable about the first axis 12a, on which there are mounted a first angular position detector 13a for detecting the angle through which the first slave arm member 11a is angularly moved, and a first load detector 14a for detecting a load imposed on the first slave arm member 11a. Likewise, the second slave arm member 11b is angularly movable with respect to the first slave arm member 11a about the second axis 12b, on which there are mounted a second angular position detector 13b for detecting the angle through which the second slave arm member 11b is angularly moved, and a second load detector 14b for detecting a load imposed on the second slave arm member 11b. The third and fourth slave arm members 11c, 11d are also angularly movable about the third and fourth axes 12c, 12d, respectively, on which there are mounted third and fourth angular position detectors 13c, 13d, respectively, and third and fourth load detectors 14c, 14d, respectively. The slave arm members 11d through 11d can be angularly moved under hydraulic pressure supplied from the vehicle body 1b.

Movement of the slave arm members 11a through 11d is controlled by the master control arm 20. The master control arm 20 is mounted on a base 25, and comprises first, second, third, and fourth master arm members 21a, 21b, 21c, 21d which are operatively coupled by first, second, third, and fourth axes 22a, 22b, 22c, 22d, and a control gripper 26 mounted on the tip of the fourth master arm member 21d. The master control arm 20 has angular position detectors (not shown) for detecting the angles through which the master arm members 21a through 21d are angularly moved. The operator in the control cabin 6 grips the control gripper 26 and manipulates the same to move the master control arm 20. Angular movements of the master arm members 21a through 21d are detected by the respective angular position detectors, which produce detected signals that are used to control movements of the slave arm members 11a through 11d of the slave manipulator arm 10 which are actuated by respective electric actuators or motors (not shown) associated respectively with the axes 12a through 12d.

The slave manipulator arm 10 is controlled in operation by the master control arm 20 as described above. The manipulator device employs a force-feedback system whereby when the slave manipulator arm 10 operates, loads acting on the slave manipulator arm 10 are fed back to the master control arm 20. In the force-feedback system, the loads applied to the respective slave arm members 11a through 11d are detected by the load detectors 14a through 14d, which transmit the detected signals to the master control arm 20 through a signal line 41. The first through fourth axes 22a through 22d are associated with first through fourth electric actuators or motors 24a through 24d electrically connected to the load detectors 14a through 14d. These motors 24a through 24d are energized on the basis of the detected signals from the load detectors 14a through 14d, so that forces commensurate with the loads on the slave arm members 11a through 11d are applied respectively to the master arm members 21a through 21d. Consequently, the operator can feel the loads on the slave manipulator arm 10 through the control gripper 26.

The electric power supply device 30 supplies electric energy to the first through fourth motors 24a through 24d. The electric power supply device 30 comprises an AC generator 32 driven by a hydraulic motor 31, a rectifier 33 connected to the AC generator 32 for converting AC electric energy generated by the AC generator 32 into DC electric energy, a regulator 34 connected to the rectifier 33 for maintaining the output voltage from the rectifier 33 at a constant level, and a battery 35 coupled through a power line 43 which is connected to a power line 42 interconnecting the regulator 34 and the motors 24a through 24d. Normally, the electric power supply device 30 supplies the electric energy generated by the AC generator 32 to the motors 24a through 24d and also to the battery 35, thereby charging the battery 35. When the motors 24a through 24d need a large amount of electric energy, the electric energy generated by the AC generator 32 is supplied to the motors 24a through 24d and also the electric energy stored in the battery 35 is supplied to the motors 24a through 24d.

Operation of the mobile vehicular apparatus will now be described below. The outriggers 8 are projected downwardly toward the ground to support the vehicle body 1b. The operator gets in the control cabin 6, and turns, raises or lowers, and extends or contracts the boom 3 to bring the control cabin 6 into a desired spatial position. Thereafter, the operator operates the master control arm 20 in the control cabin 6 to move the slave manipulator arm 10 for processing or handling a workpiece as desired.

When the loads applied to the slave arm members 11a through 11d of the slave manipulator arm 10 are small, so are the feedback force required to be generated by the motors 24a through 24d associated with the master control arm 20 which is actuated according to the signals from the angular position detectors 13a through 13d and the load detectors 14a through 14d. Therefore, the amount of electric energy required to energize the motors 24a through 24d may be small. AC electric energy generated by the AC generator 32 is converted into DC electric energy by the rectifier 33, and the DC electric energy is regulated in voltage by the regulator 34. The regulated DC electric energy is then supplied to the motors 24a through 24d and the battery 35, thereby energizing the motors 24a through 24d and charging the battery 35.

When larger loads are applied to the slave manipulator arm 10, the feedback force required to be generated by the motors 24a through 24d associated with the master control arm 20 which is actuated according to the signals from the angular position detectors 13a through 13d and the load detectors 14a through 14d are increased, so that the motors 24a through 24d require a larger amount of electric energy. In such a case, the motors 24a through 24d may not produce a required amount of mechanical energy if the electric energy is generated by the AC generator 32 only. However, in this embodiment, when the electric energy generated by the AC generator 32 is not enough, the electric energy stored in the battery 35 is discharged and supplied to the motors 24a through 24d to assist the electric energy generated by the AC generator 32. The motors 24a through 24d are therefore always capable of producing the necessary amount of mechanical energy corresponding to the loads on the slave manipulator arm 10, regardless of whether the loads on the slave manipulator arm are small or large. Accordingly, a desired force-feedback control process can be carried out.

If the AC generator 32 of the electric power supply device 30 is accidentally broken down or otherwise ceases its operation, the battery 35 continuously supplies the electric energy to the motors 24a through 24d of the master control arm 20. Consequently, the manipulator device is prevented from failing to operate immediately upon a breakdown of the AC generator 32.

With the present invention, as described above, the electric power supply device includes the AC generator connected through the rectifier to the regulator and the battery connected to the power line from the output of the regulator. The output voltage of the AC generator is maintained at a constant level by the regulator, and the AC electric energy from the AC generator is converted into DC electric energy by the rectifier. Accordingly, the electric power supply device is relatively small in size, and can supply necessary electric energy to the manipulator device even when the AC generator fails to operate. When a large amount of electric energy is needed by the manipulator device, the electric energy stored in the battery as well as the electric energy generated by the AC generator is supplied to the manipulator device. Therefore, the AC generator may be relatively small in size.

Although a certain preferred embodiment has been shown and described, it should be understood that many changes and modifications may be made therein without departing from the scope of the appended claims.

What is claimed is:

1. An electric power supply device on a mobile vehicular apparatus having a force-feedback manipulator device which includes a slave manipulator arm for working on a workpiece, a master control arm for controlling the slave manipulator arm to work on the workpiece, and a DC electric actuator mounted on the master control arm, for applying an amount of mechanical energy corresponding to a load on the slave manipulator arm, to the master control arm, said electric power supply device supplying electric energy to the DC electric actuator, said electric power supply device comprising:
   an AC generator;
   a rectifier connected to said AC generator, for rectifying an electric current generated by said AC generator;
   a regulator connected to said rectifier, for maintaining the voltage with respect to the rectified electric current at a constant level, said regulator being connected to a power line for transmitting the electric current at the constant-level voltage to the DC electric actuator; and
   a battery connected to said power line, wherein said battery is adapted to assist said AC generator when said AC generator is incapable of supplying sufficient power at times when said manipulator device is under large loads.

2. An electric power supply device according to claim 1, wherein said slave manipulator arm comprises a plurality of slave arm members angularly movably interconnected by slave arm axes, and a plurality of load detectors associated with said slave arm axes, for detecting loads applied to said slave arm members;
   said master control arm comprising a plurality of master arm members angularly movably interconnected by master arm axes, said DC electric actuator comprising a plurality of DC electric actuators associated respectively with said master arm axes of the master control arm; and
   said DC electric actuators being electrically connected to said load detectors so that the DC electric actuators are energized according to loads detected by said load detectors to exert feedback forces corresponding to the detected loads to said master arm members.

3. An electric power supply device according to claim 1, wherein said DC electric actuator comprises a DC motor.

4. An electric power supply device according to claim 1, wherein said mobile vehicular apparatus comprises a vehicle body, a boom mounted on said vehicle body for at least raised and lowered movement, and an aerial control cabin for carrying an operator, said aerial control cabin being mounted on a tip end of said boom, said slave manipulator arm being disposed in front of said aerial control cabin; and
   said master control arm, said AC generator, said rectifier, said regulator, and said battery being disposed in said aerial control cabin.

5. An electric power supply device according to claim 4, further including a hydraulic motor for actuating said AC generator, said hydraulic motor being disposed in said aerial control cabin.

6. An electric power supply device according to claim 1, wherein said generator and said battery are connected to said DC electric actuator simultaneously.

* * * * *